United States Patent [19]

Zhang et al.

[11] Patent Number: 5,279,761
[45] Date of Patent: Jan. 18, 1994

[54] CHEMICAL OXYGEN GENERATING COMPOSITIONS CONTAINING LI2O2

[75] Inventors: Yunchang Zhang, Lenexa; James C. Cannon, Olathe, both of Kans.

[73] Assignee: Puritan-Bennett Corporation, Lenexa, Kans.

[21] Appl. No.: 850,516

[22] Filed: Mar. 13, 1992

[51] Int. Cl.$^5$ .............................................. C01B 11/14
[52] U.S. Cl. ............................ 252/187.31; 252/187.1
[58] Field of Search ......................... 252/187.31, 187.1

[56] References Cited

U.S. PATENT DOCUMENTS

| | | | |
|---|---|---|---|
| 3,293,187 | 12/1966 | Markowitz | 252/186 |
| 3,702,305 | 11/1972 | Thompson | 252/187 |
| 3,736,104 | 5/1973 | Churchill et al. | 23/281 |

FOREIGN PATENT DOCUMENTS 1035248  9/1989  China.

*Primary Examiner*—Richard D. Lovering
*Assistant Examiner*—Joseph D. Anthony
*Attorney, Agent, or Firm*—Hovey, Williams, Timmons & Collins

[57] ABSTRACT

An oxygen-generating candle composition is disclosed of the type that includes an amount of an alkali metal chlorate or perchlorate oxygen source and which upon initiation and decomposition yields oxygen and residual chlorine, wherein the improvement comprises a non-toxic additive in the candle composition for suppression of the residual chlorine and to enhance uniform oxygen generation and evolution. The additive comprises from about 0.1% to about 1.0% by weight of lithium peroxide. The composition also includes a cobalt oxide catalyst, an iron powder fuel and a binder or filler.

6 Claims, 1 Drawing Sheet

CHEMICAL OXYGEN GENERATING COMPOSITIONS CONTAINING LI2O2

BACKGROUND OF THE INVENTION

This invention is broadly concerned with an improved candle for generating breathable oxygen by initiation and decomposition of an alkaline metal chlorate or perchlorate source. During decomposition of the chlorate or perchlorate, toxic free chlorine gas may be evolved. Furthermore, irregular decomposition of the alkali metal chlorate or perchlorate will result in uneven evolution of oxygen.

Thus, this invention specifically relates to an oxygen generating alkali metal chlorate or perchlorate candle composition having anon-toxic additive compound incorporated therein which regulates and smooths oxygen decomposition and suppresses formation of toxic free chlorine gas.

DESCRIPTION OF THE PRIOR ART

Chemical oxygen generating candles containing alkali metal chlorates or perchlorates have long been used as an emergency supply of breathable oxygen where weight and space limitations are important factors. Exemplary in this respect are aircraft which fly at high altitudes, submarines, and other closed atmospheric enclosures which house personnel or passengers.

Many previous oxygen candles which employed an alkali metal chlorate or perchlorate compound as the oxygen source have utilized barium peroxide ($BaO_2$) as an additive to smooth out the decomposition rate of the chlorate or perchlorate and to suppress formation of free chlorine which is a toxic gas. A metal oxide catalyst has also commonly been used to facilitate decomposition of the oxygen source, and a powdered metal fuel such as iron powder incorporated to furnish the extra heat necessary to help sustain the combustion process. A small portion of glass powder and glass fibers has also been employed as a binder. Although $BaO_2$ performs the function of suppressing free chlorine formation and smoothing oxygen evolution during decomposition of alkali metal chlorate or perchlorate oxygen sources, it is in and of itself a poisonous compound. Unless extraordinary precautions are taken, tiny $BaO_2$ particles may be released along with the oxygen generated, presenting an immediate health hazard to the person breathing the oxygen being generated and possibly contaminating the surrounding atmosphere as well. Equally as importantly, environmental regulations require the use of costly procedures and equipment to dispose of scraps and expended oxygen candles containing $BaO_2$.

Several alkali metal oxides such as $Na_2O$, $Na_2O_2$ and $KO_2$ have also been suggested as catalysts for $NaClO_3$ decomposition and to suppress acidic chlorine gas formation, but have not met with widespread usage.

M. M. Markowitz et al., in U.S. Pat. No. 3,293,187 and in an article in I&EC Product Research and Development, 3(4), 323 (1964) disclosed that $Li_2O_2$ and other alkaline compounds can suppress free chlorine formation in lithium perchlorate based oxygen candles. Manganese powder was used as a fuel, and manganese oxides formed during manganese oxidation were suggested as catalysts. In view of the fact that decomposition of lithium perchlorate tends to produce relatively high concentration of chlorine gas, Markowitz had to use 5% $Li_2O_2$ by weight. With high lithium peroxide loading the integrity of the candle remains a problem since the candle tends to melt and flow away.

U.S. Pat. Nos. 3,702,305 and 3,736,104 disclose use of sodium oxide and peroxide catalyst in a sodium chlorate oxygen candle. However, these alkali metal oxides are air sensitive and caustic. They will absorb moisture and $CO_2$ from the air and decompose, which results in decomposition upon exposure to air with concomitant production, use and storage problems. Candles using such compounds must be produced by a dry process, and production by we processing is precluded.

Chinese Patent No. 1035248A describes the use of lithium peroxide as a chlorine suppressant in a sodium chlorate oxygen candle. The formulation contains 0%–5% magnesium, 2%–7% cobalt oxide, 0%–5% $MnO_2$, 1%–6.5% $Li_2O_2$ and 1%–8% kaolin. The ingredients were dry mixed and pressed. The total oxygen generation is 6 liters. Since magnesium is a very active metal and it can react with water and release hydrogen, the procedure is not practical if carried out as a wet process. Magnesium is also difficult to ignite. Furthermore, because a relatively high proportion of lithium peroxide is used, a similar high proportion of cobalt oxide must be employed and several percent of kaolin has to be incorporated to maintain the integrity of the candle. High catalyst and additive loading increases candle weight and lowers the oxygen yield. Cobalt oxide and lithium peroxide are also relatively expensive chemicals. High loading significantly increases the cost of the candle. The Chinese patent also describes low fuel or no fuel candle compositions. However, no fuel or very low fuel candles are generally more sensitive to environmental temperatures, and have difficulty functioning in cold environments.

SUMMARY OF THE INVENTION

The present invention overcomes the problems noted above and provides a greatly improved oxygen-generating composition which contains no poisonous compounds such as barium peroxide or other toxic compounds, or highly unstable and caustic compounds such as sodium oxide and peroxide and potassium superoxide. The new formulations are suitable for either wet or dry processing. The oxygen candle additive is non-toxic and reasonably stable in air and functions to both smooth the sodium chlorate decomposition rate and suppress chlorine formation. The additive enhanced alkali metal chlorate or perchlorate formulations function well across a wide range of environmental temperatures.

Broadly speaking, the oxygen generating candle includes an oxygen source which upon initiation and decomposition yields a steady supply of the breathable oxygen. It has now been found that even a limited quantity of lithium peroxide may be incorporated into the candle and it is still functional to smooth oxygen evolution and suppress formation of residual chlorine gas resulting from the side reactions taking place.

In a preferred form, the candle includes an alkali metal chlorate or perchlorate oxygen source, from about 0.1% to about 1.0% by weight of lithium peroxide, a cobalt oxide catalyst, an iron powder fuel and a binder or filler. It has been found that utilization of $Li_2O_2$ at a concentration below that taught in Chinese Patent No. 1035248A not only is merely operable, but in fact gives relatively better performance in terms of liters of oxygen produced per gram of chemicals consumed.

When used in aircraft, weight is an important factor to be considered. Therefore, $Li_2O_2$, offers an advantage as an additive because of relatively low molar weight, thus reducing the overall candle weight.

It is an objective to make an oxygen candle which can operate over a wide range of surrounding temperatures. Oxygen candles used in aircraft must function well in a wide temperature band which may range from $-30°$ C. to $60°$ C. If the candle burns substantially faster at higher surrounding temperatures, a much larger candle must be used in order for the candle to supply oxygen for a required duration over the requested wide range of temperatures.

DESCRIPTION OF THE PREFERRED EMBODIMENT

Figure 1:
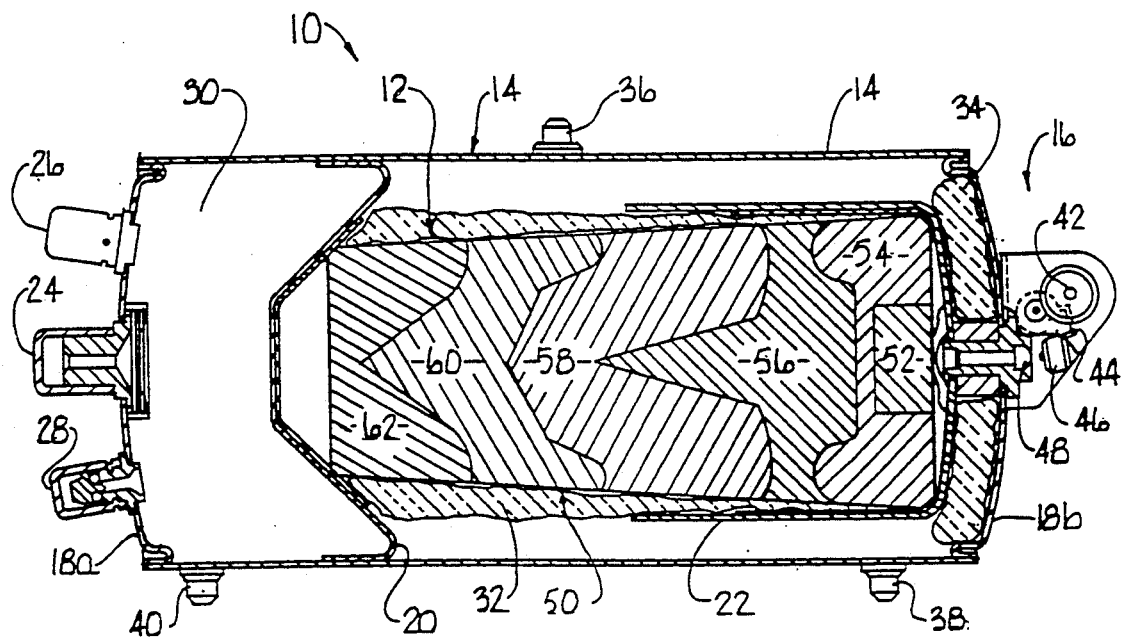
FIG. 1 is a cross-sectional view of a chemical oxygen generator useful in producing oxygen utilizing an alkali metal chlorate or perchlorate candle composition in accordance with the present invention, with a typical candle block being illustrated in cross-section in the generator canister.

Referring now to the drawings, the representatives chemical oxygen generator 10 that may be used in accordance with the present invention is illustrated in FIG. 1 and includes candle 12 installed in a canister 14 along with suitable ignition means 16. Those skilled in the art will appreciate that the candle of the invention may be used in connection with any number of other oxygen generation devices.

Canister 14 includes a tubular housing 18 closed by end caps 18a and 18b, an interior core locator partition 20, spatter shield 22, outlet valve 24 and a pair of relief valves 26, 28 mounted on end cap 18a. It is to be understood that the number and location of outlet and relief valves may vary with the overall size and intended use of the apparatus. Conventional filter material (not shown) occupies the space between core locator 20 and end cap 18a. Candle 12 is surrounded by thermal insulation 32, 34. Mounting lugs 36, 38, 40 are provided on the exterior of the canister surface.

Ignition means 16 includes pull pin 42, spring 44, hammer 46 and primer 48. Although a percussion type ignition means is preferred, any suitable form of ignition means may be employed.

Candle 12 broadly includes body 50 and an ignition pellet 52. In order to match various high altitude descent oxygen flow specifications, the preferred candle 12 has a weight of between 222 grams and 228 grams and is 5.0 inches long with a diameter of 1.4 inches at the ignition end and 1.1 inches at the outlet end. The preferred ignition pellet 52 has a diameter of 0.56 inches, is 0.25 inch thick and weighs 1.5 grams. Body 50 consists of an oxygen source and a nontoxic additive compound incorporated into the candle. Candle 12 may be formulated to further include a catalyst, a metal powder fuel, and a binder or filler. The candle 12 may be constructed of multiple layers of varying chemical composition. As shown in FIG. 1, the candle may include a first composition layer 54 in contact with ignition pellet 52, and second composition layer 56 and layers thereafter including a limited quantity of lithium peroxide additive as described herein. In other embodiments, the first composition layer 54 may also contain the non-toxic alkaline additive, $Li_2O_2$. The preferred candle includes additional layers 58, 60, 62, although any number of layers may be used.

In operation, a user engages pull pin 42 either directly or by means of a cord or other similar remote activation mechanism. When pin 42 is pulled, spring 44 is actuated, causing hammer 46 to hit primer 48 and effect ignition. Primer 48 ignites pellet 52 loaded at the top of the candle body 50. The heat generated from ignition pellet 52 then initiates combustion and therefore decomposition of the candle body. Once initiated, the candle will sustain an exothermic decomposition reaction at a uniform rate to release oxygen at a stable flow rate until the chemical core has completely reacted.

The gaseous reaction products pass through filter material 30 to remove solid particles and any residual chlorine and carbon monoxide and thence through outlet valve 24 which may be connected to a gas manifold or other oxygen delivery means. In the event of blockage of outlet valve 24 or other increased pressure inside canister, relief valves 26, 28 allow gases to escape. The generated oxygen which passes through outlet valve 24 has the high purity required for breathing. In preferred embodiments the chlorine level is lower than 50 ppb, carbon monoxide level is lower than 3 ppm and carbon dioxide is lower than 1500 ppm. The candle operates well over wide environmental temperatures.

Alkali metal chlorates or perchlorates such as $NaClO_3$, $KClO_3$, $LiClO_3$, $KClO_4$, $LiClO_4$ and $NaClO_4$ or mixtures thereof can be used as oxygen generating sources. The preferred chlorate is sodium chlorate and the preferred perchlorate is potassium perchlorate.

Sodium chlorate is a particularly preferred oxygen source because it has a relatively high oxygen yield per unit weight compared to potassium chlorate and a reasonably low decomposition temperature compared to potassium chlorate and perchlorate and lithium perchlorate. Decomposition of sodium chlorate is exothermic once initiated, which is essential for self-sustaining operation of the candle. The price of sodium chlorate is also lower than other alkali metal chlorates and perchlorates.

A small quantity of lithium peroxide is employed as an additive to smooth out the chlorate decomposition rate and to suppress free chlorine formation.

The preferred candle composition includes about 0.01% to less than about 1.0% by weight of $Li_2O_2$ with 0.1% to 0.5% of $Li_2O_2$ being particularly preferred. $Li_2O_2$ purchased from Alfa Products or Aldrich Chemical Inc. has been found to be suitable. The same additive obtained from other sources is also suitable. If the $Li_2O_2$ as purchased is of large particle size, it can be ground into a fine powder.

The preferred catalysts include the cobalt oxides, such as $CoO$, $Co_3O_4$, $Co_2O_3$, or $CoO_x$, where x equals 1.0 to 1.5, and mixtures thereof. Cobalt oxide is particularly preferred as it can lower the decomposition temperature of sodium chlorate from $450°$ C. to approximately $230°$ C. It may be obtained by decomposing cobalt carbonate or cobalt hydroxide. For example, cobalt carbonate may be decomposed at $260°$ C. for 24 hours to produce a cobalt oxide with a specific surface area of approximately 100 $m^2/g$.

Preferred metal powder fuels include iron, manganese, cobalt, nickel, tungsten, titanium, magnesium, aluminum, niobium, zirconium, and mixtures thereof.

Iron, cobalt, and manganese powder having high purity and high surface area is especially preferred. Iron is particularly suitable. It may be obtained electrolytically or by hydrogen reduction. These processes yield iron powder substantially free of carbon and other impurities which would produce toxic compounds upon operation of the candle. Use of iron powder in the oxygen-generating candle furnishes heat and assists in stabilizing chlorate decomposition. Candles containing iron are less sensitive to surrounding temperatures than catalyzed fuel free candles previously described.

Preferred binders include glass powder, glass fiber, ceramic fiber, steel wool, and mixtures thereof. These binder materials can help to keep integrity of working candles and also help in mixing and pressing.

While the precise chemical reaction is not know, lithium peroxide, is basic and should suppress free chlorine formation by either directly reacting chlorine gas or increasing the alkalinity of the candle and keeping chlorine gas from being formed.

The ignition pellet 52 typically may have a composition as follows:

| | |
|---|---|
| Fe | 30% |
| $Fe_2O_3$ | 10% |
| $Co_2O_3$ | 10% |
| Glass powder | 5% |
| $NaClO_3$ | 45% |

EXAMPLE 1

1st Layer: 10.6 gram. 77.0% $NaClO_3$, 11.0% Fe, 9.0% $CoO_x$ and 3.0% glass powder 2nd Layer: 34.3 gram. 87.7% $NaClO_3$, 8.0% Fe, 0.2% $Li_2O_2$, 2.1% $CoO_x$ and 2.0% glass powder 3rd Layer: 60.9 gram. 89.2% $NaClO_3$, 6.5% Fe, 0.2% $Li_2O_2$, 1.1% $CoO_x$, and 3.0% glass powder 4th Layer: 120.2 gram. 92.7% $NaClO_3$, 3.4% Fe, 0.2% $Li_2O_2$, 0.6% $CoO_x$, and 3.0% glass powder The candle lasted for 17.6 minutes with a oxygen release of 67.8 liters at room temperature by weight change. The oxygen generation was smooth. The oxygen contains 1115 ppm $CO_2$, 1 ppm CO, less than 20 ppb chlorine, and 5.1 mg water per liter oxygen.

EXAMPLE 2

1st Layer: 10.6 gram. 77.0% $NaClO_3$, 11.0% Fe, 9.0% $CoO_x$, and 3.0% glass powder 2nd Layer: 34.3 gram. 87.5% $NaClO_3$, 7.5% Fe, 0.5% $Li_2O_2$, 1.5% $CoO_x$ and 3.0% glass powder 3rd Layer: 60.9 gram. 89.3% $NaClO_3$, 6.5% Fe, 0.5% $Li_2O_2$, 0.7% $CoO_x$ and 3.0% glass powder 4th Layer: 115.4 gram. 94.0% $NaClO_3$, 3.2% Fe, 0.5% $Li_2O_2$, 0.3% $CoO_x$ and 2.0% glass powder The candle lasted for 30.5 minutes with a oxygen release of 65.9 liters at room temperature by weight change. The oxygen evolution was smooth.

EXAMPLE 3

Figure 2:
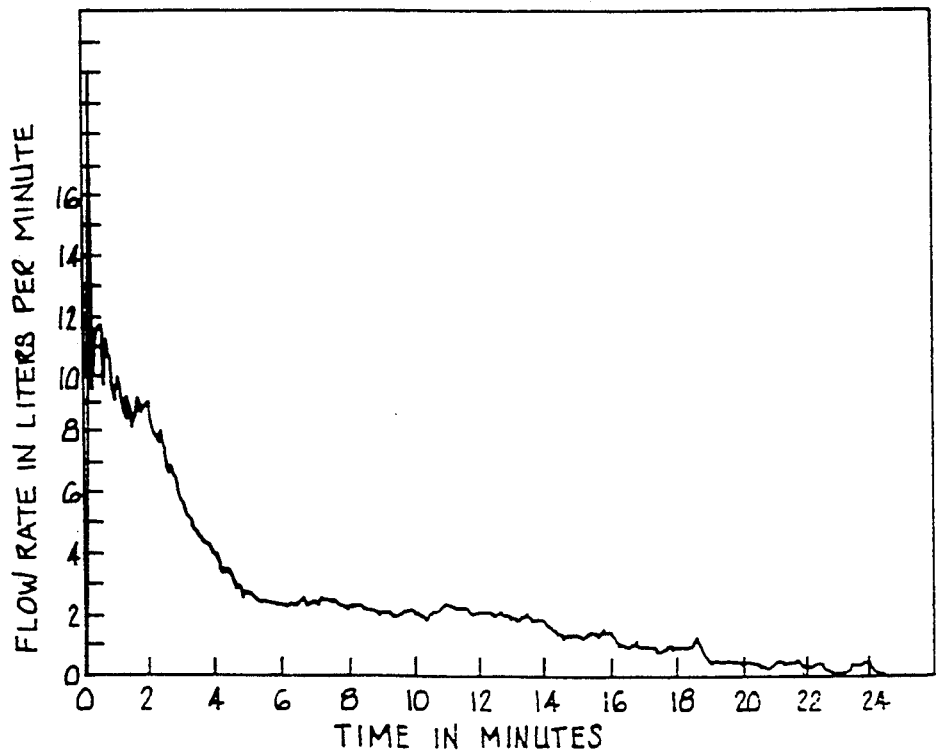
FIG. 2 is a graphical representation of the rate of flow of oxygen from a candle composition as set forth in Example 3.

1st Layer: 10.6 gram. 77.0% $NaClO_3$, 11.0% Fe, 9.0% $CoO_x$ and 3.0% glass powder 2nd Layer: 34.3 gram. 87.4% $NaClO_3$, 8.0% Fe, 0.2% $Li_2O_2$, 2.4% $CoO_x$ and 2.0% glass powder 3rd Layer: 60.9 gram. 90.8% $NaClO_3$, 6.0% Fe, 0.2% $Li_2O_2$, 1.0% $CoO_x$ and 2.0% glass powder 4th Layer: 83.7 gram. 94.0% $NaClO_3$, 3.2% Fe, 0.2% $Li_2O_2$, 0.6% $CoO_x$, and 2.0% glass powder 5th Layer: 29.6 gram. 95.9% $NaClO_3$, 1.5% Fe, 0.2% $Li_2O_2$, 0.4% $CoO_x$, and 2.0% glass powder The candle lasted for 24.3 minutes with a oxygen release of 66.4 liters at room temperature by weight change. The oxygen flow over time curve is shown in FIG. 2.

EXAMPLE 4

1st Layer: 10.6 gram. 77.0% $NaClO_3$, 11.0% Fe, 9.0% $CoO_x$ and 3.0% glass powder.

2nd Layer: 34.3 gram. 87.5% $NaClO_3$, 8.0% Fe, 0.2% $Li_2O_2$, 2.3% $CoO_x$ and 2.0% glass powder 3rd layer: 60.9 gram. 90.9% $NaClO_3$, 6.0% Fe, 0.2% $Li_2O_2$, 0.9% $CoO_x$ and 2.0% glass powder 4th Layer: 117.2 gram. 93.8% $NaClO_3$, 3.4% Fe, 0.5% $Li_2O_3$, 0.6% $CoO_x$ and 2.0% glass powder The candle lasted for 13.6 minutes with a oxygen release of 67.6 liters at room temperature by weight change.

We claim:

1. In an oxygen-generating candle composition suitable for wet processing fabrication that includes a preponderant amount on a weight basis of an alkali metal chlorate or perchlorate source other than lithium perchlorate alone, together with from about 1.5-30% by weight of a metal fuel powder selected from the group consisting of iron and cobalt, and which upon ignition and decomposition thereof will yield oxygen and residual chlorine, the improvement which comprises from about 0.1% to about 0.5% by weight of $Li_2O_2$ incorporated into the candle body composition for suppression of residual chlorine and to enhance uniform oxygen generation and evolution, said candle being an elongated body having a length greater than its diameter, said candle being operable to evolve oxygen over a period of from about 13.6 to about 30.5 minutes in order to meet high altitude descent oxygen flow specifications, with evolved chlorine being less than about 50 ppb, carbon monoxide less than about 3 ppm and carbon dioxide less than about 1500 ppm.

2. The oxygen-generating candle composition of claim 1, wherein is further included a cobalt catalyst in the candle body composition.

3. The oxygen-generating candle composition of claim 2, wherein said cobalt catalyst is a cobalt oxide.

4. The oxygen-generating candle composition of claim 3, wherein said cobalt catalyst is selected from the group consisting of CoO, $Co_3O_4$, $Co_2O_3$, $CoO_x$ and mixtures there of, wherein x ranges from about 1 to about 1.5.

5. The oxygen-generating candle composition of claim 4, wherein said cobalt catalyst is present in an amount of from about 0.1% to about 5% by weight of the candle body composition.

6. The oxygen-generating candle composition of claim 2, wherein is further included a binder selected from the group consisting of glass powder, glass fibers, ceramic fibers, steel wool, and mixtures of the foregoing.

* * * * *